United States Patent
Dixit et al.

(10) Patent No.: US 11,042,519 B2
(45) Date of Patent: Jun. 22, 2021

(54) REINFORCEMENT LEARNING FOR OPTIMIZING DATA DEDUPLICATION

(71) Applicant: Cisco Technology, Inc., San Jose, CA (US)

(72) Inventors: Sagar Shyam Dixit, Sunnyvale, CA (US); Shravan Gaonkar, Gainesville, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 205 days.

(21) Appl. No.: 16/248,322

(22) Filed: Jan. 15, 2019

(65) Prior Publication Data
US 2020/0226107 A1   Jul. 16, 2020

(51) Int. Cl.
*G06F 16/215* (2019.01)
*G06N 20/00* (2019.01)
*G06F 3/06* (2006.01)

(52) U.S. Cl.
CPC .......... *G06F 16/215* (2019.01); *G06F 3/0608* (2013.01); *G06F 3/0641* (2013.01); *G06F 3/0679* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,058,298 B2 | 6/2015 | Anglin et al. | |
| 9,367,558 B2 | 6/2016 | Rao et al. | |
| 9,424,285 B1 * | 8/2016 | Condict | G06F 3/0608 |
| 9,461,881 B2 | 10/2016 | Kumarasamy et al. | |
| 9,864,658 B1 * | 1/2018 | Barcello | G06F 11/1453 |
| 10,037,337 B1 | 7/2018 | Shanmuganathan | |
| 10,678,436 B1 * | 6/2020 | Jiang | G06F 3/0679 |
| 2009/0228888 A1 * | 9/2009 | Vengerov | G06F 9/5083 718/102 |

(Continued)

OTHER PUBLICATIONS

International Search Report and Written Opinion from the International Searching Authority, dated Mar. 17, 2020, 12 pages, for corresponding International Patent Application No. PCT/US2019/066772.

(Continued)

*Primary Examiner* — Uyen T Le
(74) *Attorney, Agent, or Firm* — Polsinelli PC

(57) ABSTRACT

Systems and methods provide for optimizing data deduplication. A physical storage node can determine a cost of performing each exclusive action of a set of exclusive actions associated with data deduplication for a predetermined number of epochs to populate an exclusive action cost matrix. The node can select an optimal exclusive action from among the set of exclusive actions based on the cost of performing each exclusive action. In response to a random number being below a threshold value, the node can determine a first cost of performing a randomly selected exclusive action from the set of exclusive actions and update the exclusive action cost matrix with the first cost. In response to the random number exceeding the threshold value, the node can determine a second cost of performing the optimal exclusive action and update the exclusive action cost matrix with the second cost.

20 Claims, 5 Drawing Sheets

(56) References Cited

U.S. PATENT DOCUMENTS

| | | | | |
|---|---|---|---|---|
| 2011/0238614 | A1* | 9/2011 | Yoon | G06N 5/045 706/52 |
| 2012/0166401 | A1* | 6/2012 | Li | G06F 16/2246 707/692 |
| 2014/0129499 | A1* | 5/2014 | Hawkins | G06N 3/02 706/46 |
| 2016/0094649 | A1 | 3/2016 | Dornquast et al. | |
| 2018/0314727 | A1 | 11/2018 | Epstein et al. | |

OTHER PUBLICATIONS

Author Unknown, "Multi-armed bandit—Wikipedia," Mar. 1, 2016, 10 pages.

Cano, Ignacio, et al., "Curator: Self-Managing Storage for Enterprise Clusters," 14$^{th}$ USENIX Symposium on Networked Systems Design and Implementation, The Advanced Computing Systems Association, Mar. 27, 2017, pp. 51-66.

Tudoran et al., "Overflow: Multi-Site Aware Big Data Management for Scientific Workflows on Clouds," IEEE Transactions on Cloud Computing, Aug. 2014, pp. 1-15.

"Multi-armed bandit," Wikipedia, Last Edited Dec. 24, 2018, pp. 1-15.

Wong, "Solving the Multi-Armed Bandit Problem," Sep. 24, 2017, pp. 1-9.

Knotko, " Advancing Mobile A/B Testing with Bayesian Multi-Armed Bandit," Jun. 28, pp. 1-22.

Altamirano, "An Introduction to Contextual Bandits," Aug. 23, 2016, pp. 1-12.

Davidson-Pilon, "Multi-Armed Bandits," Apr. 6, 2013, pp. 1-19.

Srinivasa et al., "iDedup: Latency-aware, inline data deduplication for primary storage," pp. 1-14.

Cano et al., "Curator: Self-Managing Storage for Enterprise Clusters," USENIX, The Advanced Computing Systems Association, Proceedings of the 14th USENIX Symposium on Networked Systems Design and Implementation (NSDI '17), Mar. 27-29, 2017, pp. 1-17.

\* cited by examiner

REINFORCEMENT LEARNING FOR OPTIMIZING DATA DEDUPLICATION

TECHNICAL FIELD

The subject matter of this disclosure relates in general to the field of computer networking, and more particularly, to systems and methods for optimizing data deduplication for a distributed computing system.

BACKGROUND

Data deduplication is a technique for eliminating duplicate or redundant data for improving storage utilization and/or reducing transmission of data over a network. Deduplication can include a first stage involving identifying and storing unique sequences or patterns of bytes of data. For example, the deduplication process can extract the sequences from storage and/or prior to network transmission, compute a hash of the sequences, and store the hash values in a deduplication database. Deduplication can also include a second stage involving comparing the sequences to stored copies, such as by hashing these sequences and performing a lookup in the deduplication database. If a match is found, the matched sequence can be replaced with a pointer or other reference to the stored copy. The frequency of matches can depend on the size of the sequences, which can in turn affect the amount of data that deduplication can reduce for storage and/or transfer over the network. For example, a smaller size for the sequences can increase the rate of matches while a larger size for the sequences can result in a smaller deduplication database size, faster deduplication, and less fragmentation. Some deduplication processes may apply compression to reduce the data footprint prior to hashing and/or apply defragmentation to coalesce multiple contiguous duplicates. These different considerations for how to implement deduplication, whether to compress the data and to what extent the data should be compressed, whether to hash the data and map the hashes to a deduplication database, whether to coalesce multiple contiguous sequences of the data, and the size of sequence sizes, have various trade-offs, and determining the right configuration is a trenchant problem for network operators.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
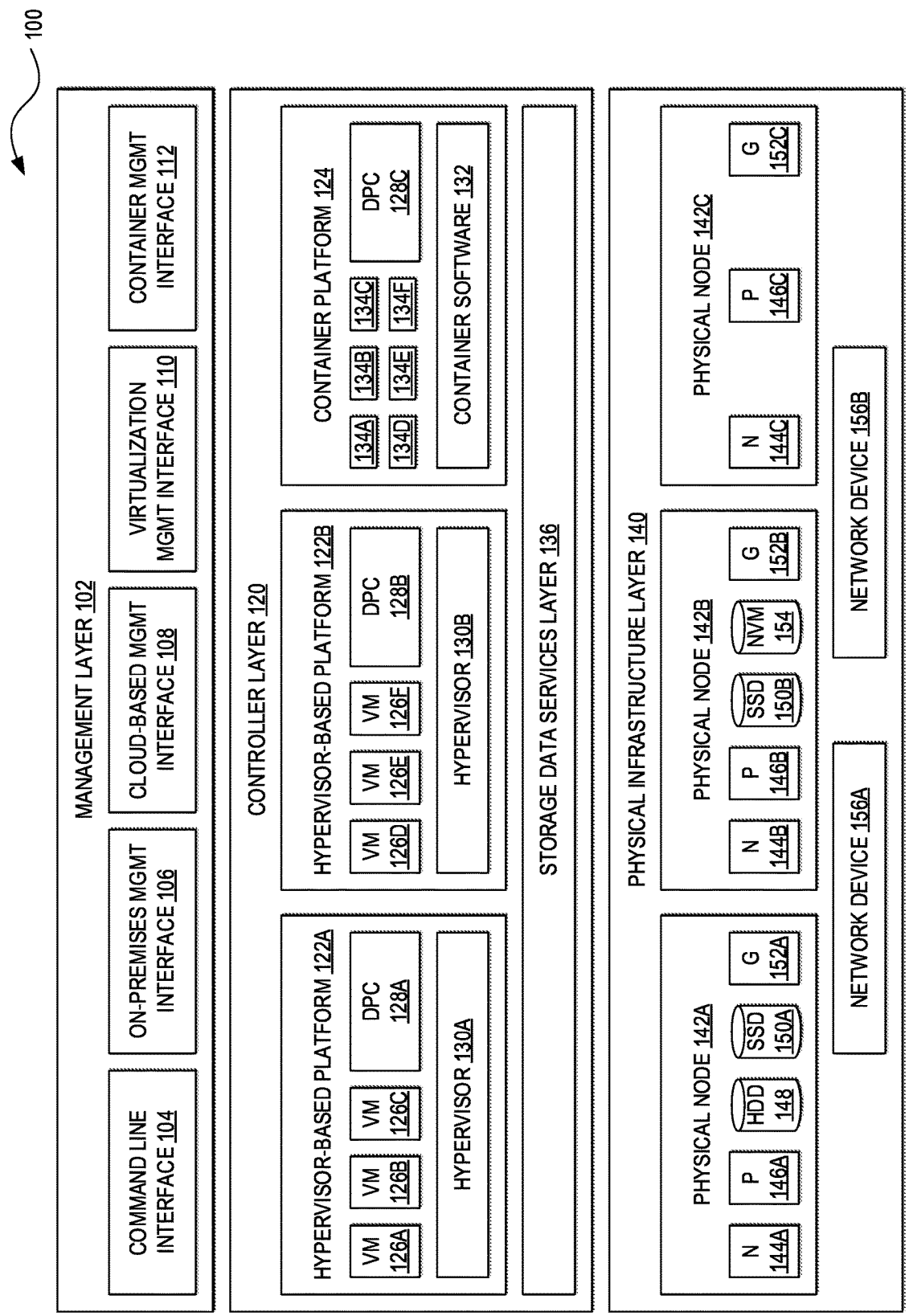
FIG. 1 illustrates an example of a storage data platform in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for optimizing data deduplication for a distributed storage data system. A physical storage node of the system can determine a cost of performing each exclusive action of a set of exclusive actions associated with data deduplication for a predetermined number of epochs to populate an exclusive action cost matrix. The physical storage node can determine an optimal exclusive action from among the set of exclusive actions based on the cost of performing each exclusive action. In response to a random number being below a threshold value, the physical storage node can determine a first cost of performing a randomly selected exclusive action from the set of exclusive actions and updating the exclusive action cost matrix with the first cost. In response to the random number exceeding the threshold value, the physical storage node can determine a second cost of performing the optimal exclusive action and updating the exclusive action cost matrix with the second cost.

Example Embodiments

Data deduplication can involve eliminating duplicate or redundant data in storage and/or before transmitting the data over a network. There can be costs associated with data deduplication, such as in terms of processing, memory, and storage utilization by nodes (also referred to as hosts, servers, endpoints, computing devices, and so forth) storing data and network throughput and latency between source and target nodes. For example, certain amounts of processing and memory can be used for calculating hashes for deduplication, compressing data, and/or defragmenting data, and certain amounts of storage can be set aside for storing data depending on the rate of deduplication, compression, and/or defragmentation, and network latency may be affected and certain amounts of network bandwidth can be consumed depending on how fast and how much data is transmitted. These computing resources (e.g., processing, memory, storage, network, power, etc.) are generally limited in a computing environment. For example, there can be heavy contention among multi-tenant applications in public clouds or networks. As another example, virtual instances (e.g., virtual machines (VMs), containers, etc.) in private clouds or enterprise networks can compete with one another for these computing resources. In such environments, where data and resource availability are unpredictable, a network operator may not be capable of assessing the rewards (or costs) of deduplication.

For example, in periods when the central processing unit (CPU) is under heavy contention in a network and data to be transferred from a source to a target is associated with a low deduplication ratio (e.g., the ratio between total capacity for storage data before removing duplicates and the actual capacity after deduplication), the cost in CPU utilization incurred in calculating hashes for the data and in network round trip time (RTT) incurred in sending the hashes for deduplication can outweigh the benefits of deduplication with respect to computing resource utilization. In such cases, the network or network operator may be better off taking a different set of actions for more effective utilization of the computing resources. On the other hand, when there is little contention for CPU and when data is associated with a high deduplication ratio, the network can benefit by sending only hashes of data for deduplication and preserving network bandwidth.

However, the network or network operator may not be capable of predicting the rewards (or costs) associated with a particular implementation of deduplication because the characteristics of the data and contention for computing resources may be unpredictable. The network or network operator may need to vigilantly monitor the data to understand its nature and, depending on availability of computing resources, determine how to perform deduplication to achieve optimal results (e.g., distributing computing resources in accordance with user-specifiable allocations). Various embodiments of the present disclosure can overcome these and other deficiencies of the prior art by utilizing reinforcement learning to determine the set of actions to take for data deduplication to optimize computing resource utilization. In some embodiments, reinforcement learning can be utilized for determining how to implement deduplication within a distributed computing system. For example, deduplication can be modeled as a multi-armed bandit (MAB) problem in which each set of actions (or arm) has an associated reward (or cost) and it is unknown at a given time which set of actions (or arm) produces the optimal results. The MAB problem and solution is derived from a scenario in which a gambler must decide which slot machine among a set of slot machines (e.g., one-armed bandits) to play, how many times to play each machine, which order to play them, and whether to continue with the current machine or try a different machine.

In the MAB problem and solution, each set of actions can provide a random reward (or cost) from a probability distribution specific to that set of actions. The objective of the gambler is to maximize the sum of rewards (or minimize the sum of costs) earned through a sequence of lever pulls. At each round, the gambler must balance between "exploitation" of the machine that has the highest expected payoff and "exploration" to get more information about the expected payoffs of the other machines.

Turning now to the drawings, FIG. 1 shows an example of a logical architecture for a distributed storage data platform 100 that can be used for deploying various embodiments of the present technology. An example of an implementation of the distributed storage data platform 100 is the Cisco HyperFlex™ HX Data Platform as realized by Cisco HyperFlex™ HX-Series nodes and Cisco® network devices (e.g., Cisco UCS® 6200 Series fabric interconnects, 6300 Series fabric interconnects, 6454 fabric interconnects, etc.). However, one of ordinary skill in the art will understand that, for the distributed storage data platform 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

The distributed storage data platform 100 can generally provide distributed storage of data to one or more applications that make use of the storage and/or storage services provided by the system. In this example, the distributed storage data platform 100 includes a management layer 102, a controller layer 120, and a physical layer 140. The management layer 102 can include one or more interfaces for centralized administration of the distributed storage data platform 100, such as a command line interface 104, an on-premises data management system interface 106 (e.g., Cisco HyperFlex™ Connect), a cloud-based data management system interface 108 (e.g., Cisco Intersight™), a virtualization platform management interface 110 (e.g., VMware vSphere®, Microsoft® System Center Virtual Machine Manager, etc.), and a container platform management interface 112 (e.g., Cisco® Container Platform). The various interfaces of the management layer 102 may execute within the nodes of the physical layer 140 and/or within separate dedicated servers that may be on-premise or co-located or off-premise and accessible as a cloud service.

The controller layer 120 can comprise one or more virtualization platforms, including one or more hypervisor-based virtualization platforms, container-based virtualization platforms, or other virtualization platforms, and storage data services layer 136. In this example, the controller layer 120 includes a first hypervisor-based virtualization platform 122A, a second hypervisor-based virtualization platform 122B, and a container-based virtualization platform 124 (collectively, virtualization platforms 122 and 124). The virtualization platforms 122A, 122B, and 124 can respectively include a data platform controller 128A, 128B, and 128C (collectively, 128). The data platform controllers 128 can operate to integrate the specific virtualization platform implemented by a storage node (also referred throughout the present disclosure as a server or host) and the distributed storage data platform 100. The data platform controllers 128 can communicate with each other over high-speed data links (e.g., 10 or 40 Gb Ethernet connections) to present a single pool of storage that spans the storage nodes of the physical layer 140.

Each of the virtualization platforms 122 and 124 can run on one or more physical servers of the physical layer 140. In some embodiments, the distributed storage data platform 100 can also support bare-metal instances (e.g., physical servers that do not implement virtualization). In addition to the data platform controller 128, the hypervisor-based virtualization platforms 122A and 122B (collectively, 122) can also respectively include a hypervisor 130A and a hypervisor 130B (collectively, hypervisors 130 or virtual instance managers 130) (e.g., Microsoft Hyper-V®, VMware vSphere®, etc.) for managing one or more virtual machines 126A-C and 126D-F (collectively, 126). Each physical server of the container-based virtualization platform 124 can include a container engine (e.g., Docker®, CoreOS® rkt, Linux® Containers (LXC), etc.), container orchestrator (e.g., Kubernetes® (k8s™), Docker Swarm®, Apache Mesos®, etc.), and/or other container software (collectively, container software 132 or virtual instance manager 132) for managing one or more containers 134A-F (collectively, 134). In some embodiments, one or more containers can run in an individual virtual machine 126 and/or on bare metal.

The storage data services layer 136 can provide storage and storage services to applications that may be executing in the virtual machines 126, containers 134, bare-metal servers, or other physical or virtual computing devices having access to the distributed storage data platform 100. The storage nodes of the distributed storage data platform 100 can access data through a data layer using data abstractions, such as files, blocks, objects, or other units of storage. Operation of the storage data services layer 136 is discussed further below with respect to FIG. 2 and elsewhere in the present disclosure.

The physical layer 140 can include one or more physical nodes 142A-C (collectively, 142) and one or more network devices 156A-B (collectively, 156). The physical nodes 142 can comprise any number of nodes and any configurations and form factor. As an example, the physical node 142A includes one or more network elements 144A (e.g., network interface card or controller (NIC), network adapter, local area network (LAN) adapter, wireless LAN (WLAN) adapter, Ethernet adapter, physical network interface, etc.); central processing units (CPUs) and memory 146A; hard disk drives (HDDs) 148A; solid state drives (SSDs) 150A; and graphical processing units (GPUs) 152A. The physical node 142A may be characterized as a hybrid storage node because it includes two different types of storage, the HDD(s) 148 and the SSD(s) 150A. The physical node 142B can include one or more network elements 144B, CPUs and memory 146B, SSDs 150B, non-volatile random-access memory express (NVMe) storage devices 154, and GPUs 152B. The physical node 142B can be characterized as an all-Flash storage node (or Flash storage node) because it includes only Flash memory for storage (e.g., the SSD(s) 150B and the NVMe storage devices 154). The physical node 142C can include one or more network elements 144C, CPUs and memory 146C, and GPUs 152C. The physical node 142C can be characterized as a compute-only storage node because it can be used for processing storage requests in the distributed storage data platform 100 but does not include storage that can be used by the distributed storage data platform 100 for persistently storing data. In other embodiments, the storage nodes 142 can also include servers including only HDDs, SSDs, or NVMe storage; servers including self-encrypting drives, large form factor drives, or other types of storage; storage data platform edge nodes (e.g., nodes that may be purpose-built for operation at the edge of a network, such as, for example, Cisco HyperFlex™ Edge nodes); and non-native nodes (e.g., nodes that may not operate "out of the box" with the distributed storage data platform 100 and may require additional software and/or other components, such as, for example, Cisco Unified Computing System™ (UCS®) M5 nodes or servers from other vendors); among other types of servers. Tower case servers, rack-mount servers, blade servers, or any other type of computing device capable of storing data can be used to implement the physical nodes 142 in various embodiments. In some embodiments, Cisco HyperFlex™ nodes may operate as the physical nodes 142.

The network devices 156 can comprise any number of physical and/or virtual network devices and various configurations and physical form factors, such as network fabric interconnects (e.g., Cisco UCS® 6200 Series fabric interconnects, 6300 Series fabric interconnects, 6454 fabric interconnects, etc.); switches (e.g., Cisco® Catalyst switches, Cisco Nexus® switches, Cisco® Industrial Ethernet switches, Cisco Meraki® MS switches, etc.); routers (e.g., Cisco® Integrated Services Routers (ISRs), Cisco® Aggregation Services Routers (ASRs), Cisco® Network Convergence Systems (NCS) routers, Cisco Meraki® MX systems, etc.); access points (e.g., Cisco Aironet® access points, Cisco Meraki® MR access points, Cisco® Small Business access points, etc.); wireless network controllers (e.g., Cisco Catalyst® wireless LAN controllers (WLCs), Cisco® 8540 WLCs, Cisco® 5520 WLCs, Cisco® 3504 WLCs, etc.); network management appliances (e.g., Cisco® Application Policy Infrastructure Controller (APIC) appliances, Cisco Digital Network Architecture (DNA™) Center appliances, Cisco Prime® appliances, etc.); firewalls or other network security appliances and services (e.g., Cisco® Advanced Malware Protection (AMP) appliances, Cisco® Industrial Security Appliances (ISAs), Cisco® Adaptive Security Appliances (ASAs), Cisco® Identity Services Engine (ISE) appliances, Cisco Firepower® appliances, Cisco Cisco® Content Security Management appliances, Cisco® Security Packet Analyzers, etc.); network analytics appliances (e.g., Cisco Tetration® appliances); and other network appliances and services.

In some embodiments, an individual data platform controller 128 can reside in a separate virtual machine, container, or other virtual instance (collectively, virtual instance 126 or 134) in each physical node 142. The virtual instance 126 or 134 can use dedicated CPU cores and memory so that its workload fluctuations may have little to no impact on applications running on its host. The data platform controller 128 can access all of its host's storage through bypass mechanisms provided by a hypervisor, virtual machine manager, virtual machine monitor, container orchestrator, container engine, or other virtualization software (collectively, virtual instance manager 130 or 132). The data platform controller 128 can implement a distributed, log-structured file system that uses high-performance memory (e.g., its host's memory, solid state drives (SSDs), non-volatile memory express (NVMe) storage, or other fast memory/storage) as part of a distributed caching layer for accelerating write responses and read requests. The data platform controller 128 can use its node's HDDs, SSDs, NVMe storage, or other storage as part of a distributed capacity layer.

The data platform controller 128 in each physical node 142 can interface with the virtual instance manager 130 or 132 in various ways. In some embodiments, the data platform controller 128 can include an agent (e.g., IOVisor) (not shown) that intercepts input/output (I/O) requests and routes requests to the physical nodes 142 responsible for storing or retrieving requested storage data. The agent can present a file system, device interface, or other data management abstraction to the virtual instance manager 130 or 132 to abstract away the distributed nature of storage in the distributed storage data platform 100. Alternatively or in addition, the data platform controller 128 can utilize application programming interfaces (APIs) of the virtual instance manager 130 or 132 to offload certain storage operations, such as snapshots and cloning. These operations can be accessed through the virtual instance manager 130 or 132.

Figure 2:
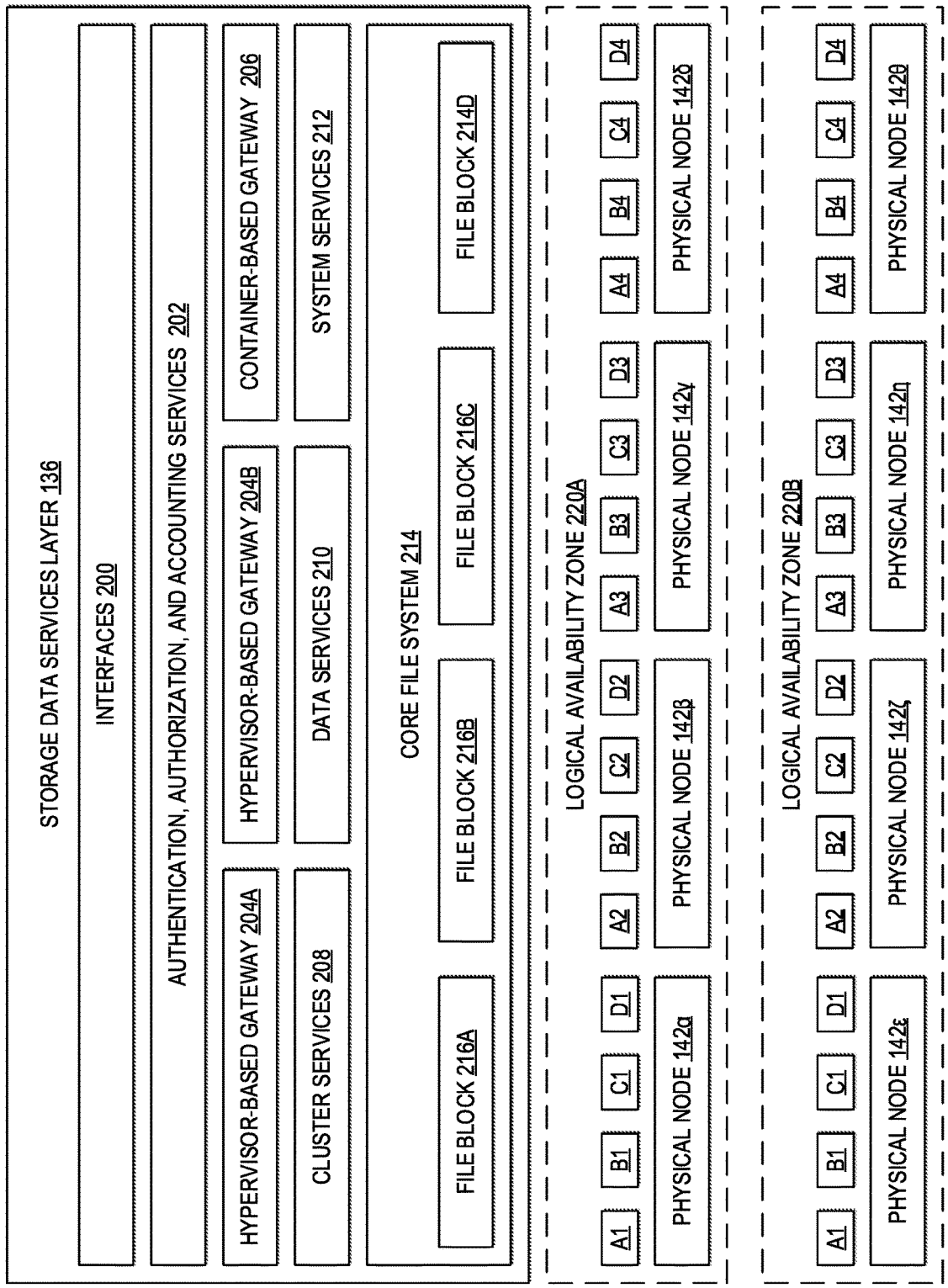
FIG. 2 illustrates an example of a storage data services layer in accordance with an embodiment.

FIG. 2 shows an example of a logical architecture of the storage data services layer 136. The storage data services layer 136 can include interfaces 200, authentication, authorization, and accounting (AAA) services 202, a hypervisor-based gateway 204A, a hypervisor-based gateway 204B, a container-based gateway and manager 206, cluster services 208, data services 210, and system services 212.

The interfaces 200 can provide for interoperability between the storage data services layer 136, other elements of the distributed storage data platform 100 (e.g., the interfaces of the management layer 102, applications running in the virtual machines 126 and containers 134, the virtual instance managers 130 and 132, and the physical nodes 142, etc.), and external elements (e.g., other networks, network devices, physical servers, virtual instances, etc.). The interfaces 200 can include one or more application programming interfaces (APIs), such as a restful state transfer (REST) API, remote procedure calls (e.g., gRPC Remote Procedure Call (gRPC)), querying languages (e.g., The Linux Foundation® GraphQL), event-driven interfaces (e.g., webhooks), and other APIs. Alternatively or in addition, the interfaces 200 can include modules for supporting one or more storage standards or protocols, such as Internet Small Computer System Interfaces (iSCSI), Fibre Channel (FC), Fibre Channel over Ethernet (FCoE), Advanced Technology Attachment (ATA), ATA over Ethernet (AoE), Network File System (NFS), Common Internet File System (CIFS), Server Message Block (SMB), Apple® Filing Protocol (AFP), Object Storage Devices (OSD), and so forth.

The AAA services 202 can include authentication services for verifying user, group, and/or system credentials and associating sessions with entities logged into the distributed storage data platform 100; authorization services allowing or prohibiting users, groups, and/or systems from performing various actions within the distributed storage data platform 100, such as creating, reading, updating, or deleting storage resources or executing a program based on an entity's identity or role; and accounting services for record-keeping and tracking entity activities, such as login sessions and command execution. In some embodiments, the Cisco® Identity Services Engine (ISE) can be used to provide the AAA services 202.

The hypervisor-based gateways 204A and 204B and the container-based gateway 206 (collectively, virtualization gateways 204 and 206) can each support their respective virtualization platforms 122 and 124 and provide higher layers of software within each virtualization platform with storage access suited to the needs of the virtualization platform.

The cluster services 208 can be responsible for coordination of the various components of the distributed storage data platform 100, delegating responsibilities, and maintaining a consistent global state of the distributed storage data platform 100. The cluster services 208 can include role assignment, distributed synchronization, group services, and so forth. The cluster services 208 can also be responsible for resiliency and making sure that data is available and consistent even after the failure of a software or hardware component (disk, server, network, etc.) of the distributed storage data platform 100. Thus, the cluster services 208 can include mirroring, failover, mirror resynchronization services. In some embodiments, the cluster services 208 can also include logical availability zones, native replication, stretch clusters, cloning, and high availability as discussed further below.

The data services 210 can include data distribution, data read and write operations, data optimization, data deduplication, data compression, log-structured distributed objects, encryption, thin provisioning, snapshots, native replication, and data rebalancing, among other storage data services as discussed further below.

The system services 212 can include garbage collection services for reclaiming memory and storage due to deletion or update of resources and system management services for configuring, monitoring, analyzing, and reporting on the entirety of the distributed storage data platform 100, clusters, the logical availability zones 220, sets of physical nodes 142, or individual physical nodes 142. One or more of the interfaces of the management layer 102 may interact directly or indirectly with the system management services.

The core file system 214 can be a distributed, log-structured file system that can dynamically handle caching and storage capacity depending on the configuration of an individual physical node 142. For example, the SSD(s) 150A of the hybrid node 142A can be utilized as part of a storage caching layer to accelerate read requests and write responses, and the HDD(s) 148 of the hybrid node 142A can be utilized as part of a capacity layer for persistent storage. As another example, the SSD(s) 150B and/or the NVMe storage device(s) 154 of the all Flash node 142B can be utilized as part of the caching layer to accelerate write responses and the SSD(s) 150B and/or the NVMe storage device(s) 154 of the all Flash node 142B can be utilized as part of the capacity layer for persistent storage. Read requests to the all flash node 142B can be fulfilled directly from data obtained in the capacity layer, and a dedicated read cache may not be required to accelerate read operations.

In this example, the core file system 214 can include file blocks 216A-D (collectively, 216). In some embodiments, the data services 210 can provide for data distribution by apportioning incoming data across the physical nodes 142 to optimize performance using the caching layer. Effective data distribution can be achieved by mapping the incoming data to stripe units that can be stored evenly across the physical nodes 142, with the number of data replicas determined by policies that an end user can configure. For example, FIG. 2 shows how the file block 216A is distributed across the physical nodes 142α-δ and 142ε-θ as stripe units A1-A4, the file block 216B is distributed across the physical nodes 142α-δ and 142ε-θ as stripe units B1-B4, the file block 216C is distributed across the physical nodes 142α-δ and 142ε-θ as stripe units C1-C4, and the file block 216D is distributed across the physical nodes 142α-δ and 142ε-θ as stripe units D1-D4. When an application in a virtual instance 126 or 134 writes data, the data can be sent to an appropriate physical node 142 (e.g., the unit including the relevant block of information) based on the stripe unit. This approach, in combination with the capability to have multiple streams writing at the same time can prevent both network and storage hotspots, can deliver the same or similar I/O performance across any storage node of the distributed storage data platform 100 regardless of the location of the virtual instance 126 or 135, and can provide more flexibility in workload placement. In contrast, conventional systems may use a locality approach that does not make full use of available networking and I/O resources. In addition, when a virtual instance 126 or 134 is migrated to a new location, the distributed storage data platform 100 does not require data to be removed. This can significantly reduce the impact and cost of the migration of the virtual instance 126 or 134.

In some embodiments, the striping of data across the physical nodes 142 can support two or more logical availability zones 220A and 220B (collectively, 220). This feature can automatically partition a set of nodes 142 of the distributed storage data platform 100 into a set of availability zones based on the number of nodes in a cluster and the replication factor for the data. Each availability zone 220 can have one copy of each file block 216 (e.g., the logical availability zones 220A and 220B both include the set of file blocks A-D in the form of stripe units A1-A4, B1-B4, C1-C4, and D1-D4). Thus, when multiple component or node failures occur in a single availability zone 220 and make the single availability zone unavailable, the distributed storage data platform 100 can continue to operate if another logical availability zone 220 has a copy of the data. For example, a conventional system, which does not support logical availability zones and consists of 20 nodes and configured for a replication factor of three, can have no more than two nodes fail without the conventional system having to shut down. On the other hand, the distributed storage data platform 100, having the same number of nodes and the same replication factor, can be partitioned into five logical availability zones (three of which are not shown in FIG. 2)

with four nodes in each zone, and can continue operation even if all of the nodes in up to two availability zones fail.

In some embodiments, the data services 210 can assemble blocks to cache until a configurable-sized write log is full or until workload conditions dictate that it can be propagated to the capacity layer. When existing data is logically overwritten, the data services 210 can append a new block to the write log and update the metadata. When the data is propagated to an HDD, the write operations can include a single seek operation with a large amount of sequential data written. This can improve performance relative to conventional systems that use a read-modify-write model characterized by numerous seek operations on HDD(s) with small amounts of data written at a time. This approach can also benefit sold-state configurations (in which seek operations may not be as time consuming) by reducing the write amplification levels of SSDs and the total number of writes that the Flash memory experiences due to incoming write operations and the random overwrite operations of the data that can result in conventional systems.

In some embodiments, when data is propagated to a disk in an individual physical node 142, the data can be deduplicated, compressed, and/or defragmented. This can occur after the write operation is acknowledged so that no performance penalty may be incurred for these operations. Data can then be moved to the capacity layer and the corresponding write cache segments can be released for reuse. In some embodiments, the distributed storage data platform 100 can utilize reinforcement learning to automate how to implement deduplication, such as whether to compress the data and to what extent the data should be compressed, whether to hash the data and map the hashes to a deduplication database, whether to coalesce multiple contiguous file blocks, the size of file blocks, and so forth to optimize computing resource utilization and performance as discussed further below with respect to FIG. 3 and elsewhere in the present disclosure.

In some embodiments, the data services 210 can also support hot data sets (e.g., caching, in memory, data that may be frequently or recently read from the capacity layer). In the physical nodes 142, hot data sets may also be cached in the SSD(s) 150, NVMe storage device(s) 154, and/or other fast memory/storage. This can be especially advantageous for the physical node 142A that includes the HDD(s) 148 for persistent storage because having the most frequently used data in the caching layer can help accelerate the performance of workloads. For example, when applications and the virtual machines 126 and containers 134 in the physical node 142A attempt to modify data, the data can be read from the cache so that data on the HDD(s) 148 may not need to be read and expanded. As the distributed storage data platform 100 decouples the caching and capacity layers, a network operator can independently scale I/O performance and storage capacity.

As discussed, all Flash or all NVMe nodes may not use a read cache. Data caching may not provide any performance benefit because the persistent data copy already resides on high-performance storage for the all Flash and all NVMe nodes. Instead, dispatching read requests across the whole set of SSDs or NVMe storage devices can prevent a particular cache from becoming a bottleneck.

In some embodiments, the data services 210 can provide for data optimization via deduplication, compression, and/or defragmentation that is always on for objects in the cache (e.g., SSD, NVMe, memory, etc.) and capacity (SSD, NVMe, HDD, etc.) layers. Unlike conventional systems, which require these features to be turned off to maintain performance, the deduplication, compression, and defragmentation capabilities of the data services 210 can be designed to sustain and enhance performance and significantly reduce physical storage capacity requirements.

In some embodiments, data deduplication can be used on all storage in the storage data platform 100, including memory, SSDs, NVMe, and HDDs. Data can be deduplicated in the capacity layer to save space, and it can remain deduplicated when it is read into the caching layer in the hybrid nodes 142A. This can allow a larger working set to be stored in the caching layer and accelerate read performance for configurations that use HDDs.

In some embodiments, the data services 210 can apply compression on data to save storage capacity. The data services 210 platform can use CPU-offload instructions to reduce the performance impact of compression operations. In addition, the log-structured distributed objects store can be leveraged so that compression may have little to no effect on modifications (write operations) to previously compressed data. For example, incoming modifications can be compressed and written to a new location, and the existing (old) data can be marked for deletion (unless the data needs to be retained for a snapshot).

In some embodiments, the data services 210 can apply defragmentation on data. The data services 210 can use CPU-offload instructions to coalesce multiple contiguous file blocks to optimize performance. In addition, the data services 210 can utilize the log-structured distributed objects store to further optimize performance of defragmentation. For example, incoming modifications can be defragmented and written to a new location, and the existing (old) data can be marked for deletion (unless the data needs to be retained for a snapshot).

In some embodiments, the data services 210 can use a log-structured distributed-object store that groups and compresses data that filters through deduplication services into self-addressable objects. These objects can be written to disk in a log-structured, sequential manner. Incoming I/O, including random I/O requests, can be written sequentially to both the caching and capacity tiers. The objects can be distributed across all the nodes 142 in the distributed storage data platform 100 to make uniform use of storage capacity. By using a sequential layout, the data services 210 can help increase flash-memory endurance and make the best use of the read and write performance characteristics of HDDs, which may be well suited for sequential I/O operations. Because read-modify-write operations can be avoided, compression, snapshot, and cloning operations may have little or no impact on overall performance.

In some embodiments, the data services 210 can compress data blocks into objects that are sequentially laid out in fixed-size segments, and that can in turn be sequentially laid out in a log-structured manner. Each compressed object in a log-structured segment can be uniquely addressable using a key, with each key fingerprinted and stored with a checksum to provide high levels of data integrity. In addition, the chronological writing of objects can help the distributed storage data platform 100 to quickly recover from media or node failures by rewriting only the data that came into the platform after it was truncated due to a failure.

In some embodiments, the storage data services layer 136 can include self-encrypting drives (SEDs) for encrypting both the caching and/or capacity layers of the distributed storage data platform 100. Integrated with key management software or with passphrase-protected keys, encryption of persistent storage data can facilitate compliance with regulatory and industry standards, such as the Health Insurance Portability and Accountability Act (HIPAA), Payment Card Industry Data Security Standard (PCI-DSS), Federal Information Security Management Act (FISMA), Sarbanes-Oxley regulations, Federal Information Processing Standard (FIPS), and so forth.

In some embodiments, the data services 210 can include thin provisioning features for providing efficient use of storage by eliminating the need to forecast, purchase, and install disk capacity that may remain unused for a long time. The data services 210 can present virtual data stores having any amount of logical space to applications while the amount of physical storage space that is actually needed can be determined when the data is written. As a result, a network operator can expand storage on existing nodes and/or expand the storage platform 100 by adding more storage-intensive nodes as business requirements dictate, eliminating the need to purchase large amounts of storage before it may be needed.

In some embodiments, the distributed storage data platform 100 can use metadata-based, zero-copy snapshots to facilitate backup operations and remote replication for applications that may require always-on data availability. In this manner, space-efficient snapshots can allow for frequent online backups of data without needing to worry about the consumption of physical storage capacity. Data can be moved offline or restored from these snapshots instantaneously. The snapshot services can include fast snapshot updates in which modified data that is contained in a snapshot can be written to a new location and metadata can be updated without the need for read-modify-write operations; rapid snapshot deletions in which only a small amount of metadata that is located on an SSD may be deleted in contrast to conventional solutions that use delta-disk techniques that require a long consolidation process; and highly specific snapshots in which snapshots can be taken on an individual file basis and can be mapped to drives in a virtual instance to enable different snapshot policies on different virtual instances.

In some embodiments, the distributed storage data platform 100 can include native replication services to provide policy-based remote replication for disaster recovery and virtual instance migration purposes. Through the management layer 102, an administrator can create replication policies that specify the repair point objective (RPO) and add virtual instances to protection groups that inherit user-defined policies. Native replication can be used for planned data movement (for example, migrating applications between locations) or unplanned events, such as data center failures. Test recovery, planned migration, and failover can be scripted through PowerShell® or other suitable interface.

In some embodiments, the distributed storage data platform 100 can replicate data on a per-virtual-instance basis. Thus, unlike conventional systems which may replicate entire volumes, replication can occur in the distributed storage data platform 100 on a fine-grained basis on only those remote copies of the data of interest to the administrator. The distributed storage data platform 100 can coordinate the movement of data, and the physical nodes 142 can participate in the data movement using a many-to-many connectivity model. This model can distribute the workload across all participating nodes, thereby avoiding hot spots and minimizing performance impacts. Once the first data is replicated, subsequent replication can be based on data blocks changed since the last transfer. As an example, recovery point objectives (RPOs) can be set in a range from 15 minutes to 25 hours. An administrator can utilize configuration settings to constrain bandwidth so that remote replication does not overwhelm a wide-area network (WAN) connection.

In some embodiments, the distributed storage data platform 100 can include support for stretch clusters. Stretch clusters can allow for two identical configurations of clusters in two locations to operate as a single cluster. With synchronous replication between sites, a complete data center failure can occur, and applications can still be available with zero data loss. In other words, applications can continue running with no loss of data. The recovery time objective can be the time that it takes to recognize the failure and put a failover into effect.

In some embodiments, the distributed storage data platform 100 can include support for clones or writable snapshots that can be used for rapid provisioning, such as for instantiating virtual instances executing virtual desktops or applications for test and development environments. Clones can be implemented to be fast and space-efficient by replicating storage volumes for virtual instances through metadata operations, with actual data copying performed only for write operations. With this approach, any number of clones can be created and deleted in very short periods of time. Compared to conventional systems that use full-copy methods, this approach can save a significant amount of time, increase operational agility, and improve developer productivity. Clones can be deduplicated when they are created. When clones start diverging from one another, data that is common between them can be shared, with only unique data occupying new storage space. The deduplication services can eliminate data duplicates in the diverged clones to further reduce the clone's storage footprint. As a result, a large number of application environments can be deployed with relatively little storage capacity.

In some embodiments, the distributed storage data platform 100 can support high availability by using the log-structured distributed-object store to replicate incoming data. Based on user-configurable policies, data that is written to the write cache can be synchronously replicated to one or more caches located in different nodes before the write operation is acknowledged to the application. This can allow incoming write operations to be acknowledged quickly while protecting data from storage device or node failures. If an SSD, NVMe device, or node fails, the replica can be quickly recreated on other storage devices or nodes using the available copies of the data.

In some embodiments, the log-structured distributed-object store can also replicate data that is moved from the write cache to the capacity layer. This replicated data can likewise be protected from storage device or node failures. With two replicas, or a total of three data copies, a cluster can survive uncorrelated failures (e.g., failures that occur on different physical nodes) of two storage devices or two nodes without the risk of data loss. Failures that occur on the same node can affect the same copy of data and may be treated as a single failure. For example, if one disk in a node fails and subsequently another disk on the same node fails, these correlated failures can count as one failure in the system. In this case, the cluster could withstand another uncorrelated failure on a different node.

If a problem occurs in the data platform controller 128 of an individual physical node 142, data requests from the applications residing in that node can be automatically routed to other controllers in the distributed storage data platform 100. This same capability can be used to upgrade or perform maintenance on the data platform controller 128 on a rolling basis without affecting the availability of the distributed storage data platform 100 or data.

In some embodiments, the data services 210 can include data rebalancing functions. In the distributed storage data platform 100, no overhead is associated with metadata access, and rebalancing can be extremely efficient. Rebalancing can be a non-disruptive online process that occurs in both the caching and capacity layers, and can be is moved at a fine level of specificity to improve the use of storage capacity. The data services 210 can automatically rebalance existing data when nodes and drives are added or removed or when they fail. When a new node is added to the distributed storage data platform 100, its capacity and performance can be made available to new and existing data. The rebalancing services can distribute existing data to the new node and help ensure that all nodes in the distributed storage data platform 100 are used uniformly from both capacity and performance perspectives. If a node fails or is removed from the distributed storage data platform 100, the rebalancing engine can rebuild and distributes copies of the data from the failed or removed node to available nodes in the distributed storage data platform 100.

Figure 3:
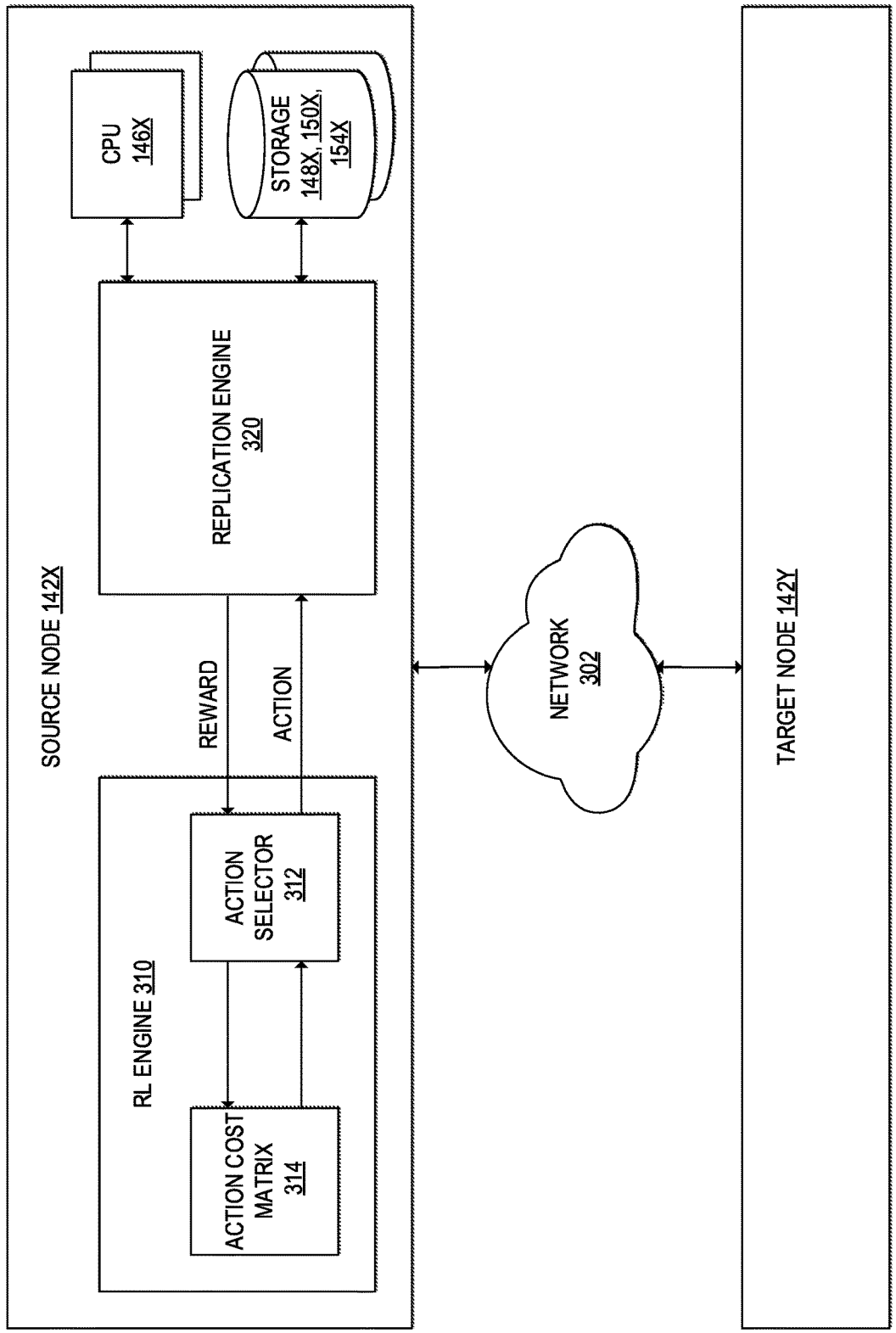
FIG. 3 illustrates an example of a reinforcement learning engine for optimizing deduplication of storage data in accordance with an embodiment.

FIG. 3 shows an example of a block diagram 300 illustrating how deduplication can be implemented by the storage data services layer 136 (e.g., such as part of the data services 210). In this example, the block diagram 300 includes a source storage node 142X connected to a target storage node 142Y over a network 302. The network 302 can comprise any number of network devices and any number of nodes in any configuration. For example, the source storage node 142X and the target node 142Y may be connected across a wide area network (WAN) spanning one or more dispersed geographic regions; connected within a local area network (LAN) in the same data center, co-location, campus network, or other type of LAN; located within the same rack or chassis; and so forth.

The source storage node 142X can include a reinforcement learning (RL) engine 310 and a replication engine 320 for carrying out deduplication operations. The target storage node 142Y may include the same or similar elements and/or complementary elements (e.g., elements for reconstructing deduplicated data or decompressing compressed data) but are not shown here for purposes of simplicity and conciseness. In general, the RL engine 310 can approach deduplication as a multi-armed bandit (MAB) problem that adapts to maximize the rewards (or minimize the costs) among separate sets of one or more actions for deduplicating data from the source storage node 142X to the target storage node 142Y.

In this example, the RL engine 310 includes an MAB exclusive action selector element 312 and an exclusive action cost matrix 314. The MAB exclusive action selector element 312 can set forth the set of exclusive actions (or arms) that the RL engine 310 can take for deduplication and the logic for selecting a particular exclusive action (or arm). As a simple example, the set of independent actions can include:
- Compressing the data (e.g., Run-length encoding (RLE), Huffman coding, Prediction by partial matching (PPM), Burrows-Wheeler, Lempel-Ziv (LZ) and variants, etc.);
- Computing hashes for the data (e.g., Cyclic Redundancy Check (32-bit) (CRC-32), Message Authentication Code (MAC), Universal Hashing Message Authentication Code (UMAC), Message Digest Algorithm Number 5 (MD5), Secure Hash Algorithm (SHA-1), Research and Development in Advanced Communications Technologies ((RACE) Integrity Primitives Evaluation (RIPE)) Message Digest (160-bits) (RIPEMD-160), etc.) and mapping the hashes to a deduplication database; and
- Coalescing contiguous duplicate file blocks.

One of ordinary skill in the art will appreciate that there can be any number of different actions and any number of combinations of different actions in various other embodiments but these three actions are provided herein as a set of independent and exclusive deduplication actions for brevity and ease of understanding. Table 1 sets forth the set of exclusive actions (or arms) derived from the independent actions. For instance, as there are three independent actions 'M' in this example, there can be $2^M$ or eight exclusive actions 'A' in which a value of zero can indicate that an independent action is not performed and a value of one can represent that the independent action is performed during an epoch.

TABLE 1

Example of Exclusive Actions 'A' of RL Engine for Deduplication

| Action | 1 | 2 | 3 | 4 | 5 | 6 | 7 | 8 |
|---|---|---|---|---|---|---|---|---|
| Compress | 0 | 1 | 0 | 1 | 0 | 1 | 0 | 1 |
| Compute Hash | 0 | 0 | 1 | 1 | 0 | 0 | 1 | 1 |
| Coalesce | 0 | 0 | 0 | 0 | 1 | 1 | 1 | 1 |

The exclusive action cost matrix 314 sets forth the cost for each exclusive action taken by the RL engine 310 and the logic for calculating the costs. One of ordinary skill in the art will understand that minimizing a cost 'C' is equivalent to maximizing a reward 'R' (e.g., R=−C) for all relevant purposes. In this example, the costs for each exclusive action can be determine based on the computing resources that are available for deduplication when the resources are being utilized by other processes. For instance, Available CPU=Total CPU−Utilized CPU by processes besides data replication (e.g., processes unassociated with data replication). The Available CPU can be used towards compressing data, coalescing data, or computing hashes at different quantities. Similarly, Available Network Bandwidth can be used towards sending data and/or hashes. In some embodiments, different computing resources can be quantified under a common metric. Table 2 sets forth an example of an approach for normalizing metrics of different computing resources associated with an exclusive action.

TABLE 2

Example Approach for Normalizing Cost of Exclusive Action

| Resource | Measurement | Conversion Used | Common Metric/Unit |
|---|---|---|---|
| CPU | Cycles (C) | Number of Cycles ($N_c$) | $N_c \times C$ |
| Bandwidth | Bytes/second (B/s) | Bytes (B) | B/B/s |
| Latency | Time in seconds (T) | 1 | T |

In this manner, the RL engine 310 can compute the total cost consumed by each exclusive action for a batch of 'b' blocks. For example, the RL engine 310 can define the cost from each exclusive action with respect to a random variable a' as the set of costs $\{R^1, R^2, \ldots, R^k\}$ and the expected value as the set of means $\{m^1, m^2, \ldots, m^k\}$. As discussed, the MAB exclusive action selector 312 may select only one exclusive action (or arm) at each epoch. The RL engine 310 can optimize deduplication for a particular time frame, such as the last 'N' epochs or a time interval 't' (e.g., last 6 hours). In particular, the RL engine 310 can attempt to maximize the rewards (or minimize the costs) over the time frame as:

$$Q(A=a,l)=\Sigma_{i=l}^{N+l}(\hat{r}_i)\gamma^{N+l-i}, \quad (\text{Equation 1})$$

where $\hat{r}_i$ is the reward (or cost) of an action at epoch i=a and γ is the discount factor 0≤γ<1 (where l can represent the algorithm running beyond 'N' epochs such that the discount factor makes their impact negligible).

The number of times the reward was chosen can be defined as:

$$N(A=a,l)=\Sigma_{i=l}^{N+l}a_i=a), \quad (\text{Equation 2})$$

where $a_i$ is the action selected at epoch i=a.

Table 3 sets forth an example of the exclusive action cost (or reward) matrix 314 for each action after a choice of an exclusive action at each epoch. At each epoch, the choice of action $R^i$ can define the cost (or reward) for a batch and 0 for the rest. The cost (or reward) for the time frame can be computed as the sum of the matrix entries.

TABLE 3

Example of Cost (or Reward) Matrix for Last N actions

| Epoch | l + 1 | l + 2 | l + 3 | l + 4 | ... | ... | ... | ... | l + N | l + N + 1 |
|---|---|---|---|---|---|---|---|---|---|---|
| $R^1$ | 0 | $R^1_2$ | 0 | 0 | 0 | 0 | 0 | 0 | 0 | — |
| $R^2$ | $R^2_1$ | 0 | 0 | 0 | 0 | 0 | 0 | 0 | 0 | — |
| $R^3$ | 0 | 0 | 0 | 0 | 0 | 0 | 0 | $R^3$ ... | 0 | — |
| $R^4$ | 0 | 0 | 1 | $R^4_4$ | 0 | 0 | 0 | 0 | $R^4_N$ | — |
| $R^5$ | 0 | 0 | 0 | 0 | 0 | $R^5$ ... | 0 | 0 | 0 | — |
| $R^6$ | 0 | 0 | 0 | 0 | 0 | 0 | 0 | 0 | 0 | — |
| $R^7$ | 0 | 0 | 0 | 0 | 0 | 0 | 0 | 0 | 0 | — |
| $R^8$ | 0 | 0 | 0 | 0 | $R^8$ ... | 0 | $R^8$ ... | 0 | 0 | — |

The last column (e.g., l+N+1) epoch is where the RL engine 310 can make a decision for an action 'i'. Tables 4-6 set forth pseudo code showing how the action can be selected in some embodiments.

TABLE 4

Example of Pseudo Code for Main Function

1. Initialize the system to 'A=a' (e.g., one of the columns of Table 1 or a 1xK array with one entry set to 1 and the rest of the entries set to 0)
2. Set 'a' to any value between 0 and 1 and γ to be between 0 to 1
3. Initialize next action probability (e.g., B.Q = [1/K,...,1/K])
4. Initialize the number of times the last action was performed (e.g., B.N = 0[1×K])
5. Create queue to store the last N rewards (e.g., B.RQueue = 0[N×K])
6. Create a queue to store the last N actions taken (e.g., B.NQueue = 0[N×K])
7. For each epoch,
8.    Generate a random number, r1, between 0 to 1
9.    If r1 < a, then choose a random action a_cur = Random(A)
10.    If r1 ≥ a, then Run a_cur = Algorithm:Get_Best_Bandit(B)
11.    Run the action a_cur, and compute the Reward R
12.    Run Algorithm:Update_Bandit(a_cur, B, γ, R(a_cur))

TABLE 5

Example Pseudo Code for Update_Bandit

Update_Bandit(A=a, B, γ, R) where 'A' is action, 'B' is bandit, and 'R' is the last reward
1. For each action 'a' in B.Q
2.    chosen = 1 iff a == a_cur else chosen = 0
3.    B.NHistory[a].enqueue(chosen)
4.    B.RHistory[a].enqueue(chosen * R)
    (reward is set only for chosen action)
5.    oldest_action = B.NHistory[a].dequeue( )
6.    B.N[a] = B.N[a] + chosen − oldest_action TABLE 5-continued Example Pseudo Code for Update_Bandit 7.    oldest_reward = B.RHistory[a].dequeue( ) * $\gamma^N$ (can be ignored if oldest_reward <<< $10^{-5}$)
8.    B.Q[a] = B.Q[a] − oldest_reward
9.    $B.Q[a_{cur}] = B.Q[a_{cur}] + \frac{((\gamma \times R) - B.Q[a_{cur}])}{B.N(a_{cur})}$

TABLE 6

Example Pseudo Code for Get_Best_Bandit Function

1. Set CDF = 0[1×K], sum= 0
2. For each action 'a' in B.Q
3.    sum = CDF[a] = sum+ B.Q[a]
4. Generate random variable, 'r,' between (0 to sum)
5. prev = 0

TABLE 6-continued

Example Pseudo Code for Get_Best_Bandit Function

6. For each action 'a' in B.Q
7.    If 'r' is between prev and CDF[a], return action 'a'
8.    prev = CDF[a]

Figure 4:
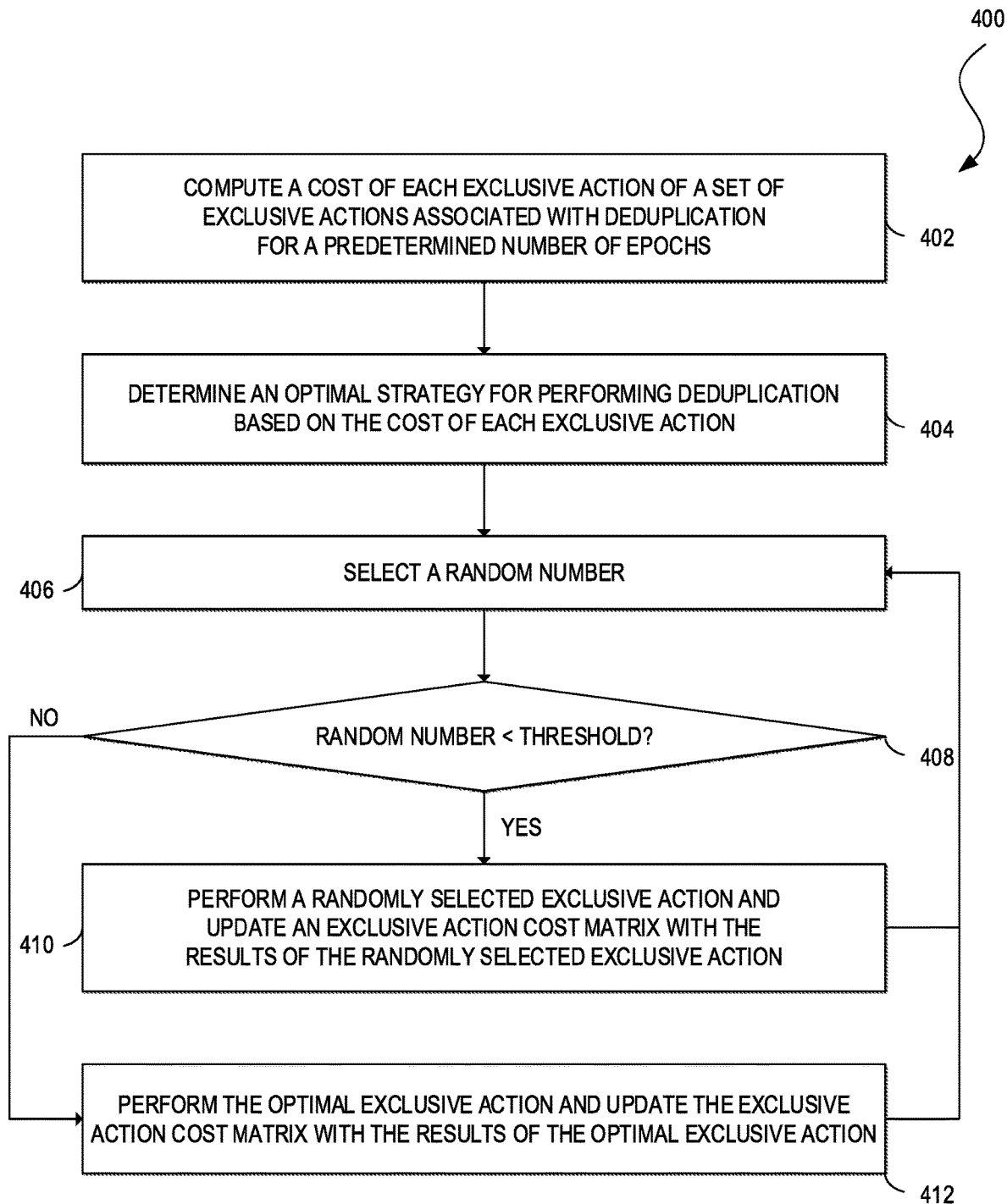
FIG. 4 illustrates an example of a process for optimizing deduplication of storage data in accordance with an embodiment.

FIG. 4 illustrates an example of a process 400 for performing data deduplication in accordance with user-specifiable allocations of computing resources. One of ordinary skill will understood that, for any processes discussed herein, there can be additional, fewer, or alternative steps performed in similar or alternative orders, or in parallel, within the scope of the various embodiments unless otherwise stated. In some embodiments, the process 400 can be performed at least in part by a storage data platform (e.g., the distributed storage data platform 100), a storage services layer of a storage data platform (e.g., the storage data services layer 136), data services of a storage data platform (e.g., the data services 210), a physical storage node (e.g., the physical storage nodes 142) of a storage data platform, a reinforcement learning (RL) engine of a physical storage node (e.g., the RL engine 310), and/or a replication engine of a physical storage node (e.g., the replication engine 320).

The process 400 can begin with step 402 in which a physical storage node can compute a respective cost for performing each exclusive action of a set of exclusive actions associated with data deduplication for a predetermined number of epochs. Each exclusive action can comprise one or more independent deduplication actions, such as compressing the data, computing one or more hashes for the data and mapping the hashes to a deduplication database (e.g., storing a hash as a new entry if the hash does not match any other entry in the deduplication database or pointing the data to an existing entry if the hash matches the existing entry), and/or coalescing multiple contiguous blocks of the data. In some embodiments, the cost can be calculated as the available amount of a computing resource (e.g., processing, memory, storage, network, power, etc.) of the physical storage node or the difference between the total amount of the computing resource and the amount of the computing resource utilized by processes running on the physical storage node besides replication. For example, Available CPU=Total CPU−Utilized CPU by processes other than replication. In some embodiments, computing the cost for performing each exclusive action of the set of exclusive actions associated with data deduplication can also include normalizing the different metrics for each type of computing resource and combining them, such as shown in Table 2. After the predetermined number of epochs, the physical storage node will have populated an exclusive action cost matrix (e.g., the exclusive action cost matrix 314, an example of which is set forth in Table 3).

At step 404, the physical storage node can determine the optimal strategy for performing deduplication according to a user-specifiable allocation of computing resources. For example, the physical storage node can determine the deduplication strategy that minimizes one or more of CPU utilization, memory utilization, storage utilization, network bandwidth utilization, network latency, power, and so forth. An example of this approach is set forth in the pseudo code of Table 6. As another example, the physical storage node can determine a deduplication strategy that strikes a balance between two or more of these objectives. As yet another example, the physical storage node can determine a deduplication strategy such that utilization of one or more computing resources does not exceed a predetermined threshold. In some embodiments, these various deduplication strategies may also be combined, such as minimizing utilization of one computing resource and ensuring that utilization of another computing resource does not exceed a predetermined threshold.

The process 400 can proceed next to the physical storage node applying a multi-armed bandit (MAB) algorithm to select the next exclusive action to perform after the predetermined number of epochs of step 402, such as set forth in the pseudo code of Table 4. For example, at step 406, the physical storage node can select a random number. The MAB algorithm can continue to a decision block 408 in which the physical storage node can compare the random number to a threshold value. If the random number is less than the threshold value, the process 400 can continue to step 410 in which the physical storage node may select a random exclusive action as the next action to perform, perform the randomly selected exclusive action, and update the exclusive action cost matrix with the results of performing the randomly selected exclusive action. The process 400 can then return to step 406 to apply the MAB algorithm again for selecting the next exclusive action to perform for deduplication.

If the random value is greater than or equal to the threshold value, then the process 400 can proceed to step 412 in which the physical storage node can perform the exclusive action associated with the minimum cost (or maximum reward), such as determined at step 404. After step 412, the process 400 can return to step 406 to apply the MAB algorithm again for selecting the next exclusive action to perform for deduplication.

In this manner, the physical storage can strategically calculate rewards of deduplication for dynamically changing data and availability of computing resources. In some embodiments, reinforcement learning can enable the physical storage node to perform deduplication free of configuration, preset models, and/or tuning parameters from administrators. In other embodiments, the physical storage node can be capable of performing deduplication operations optimally (e.g., according to user-specifiable allocations of computing resources) while being cognizant of available resources.

Figure 5A:
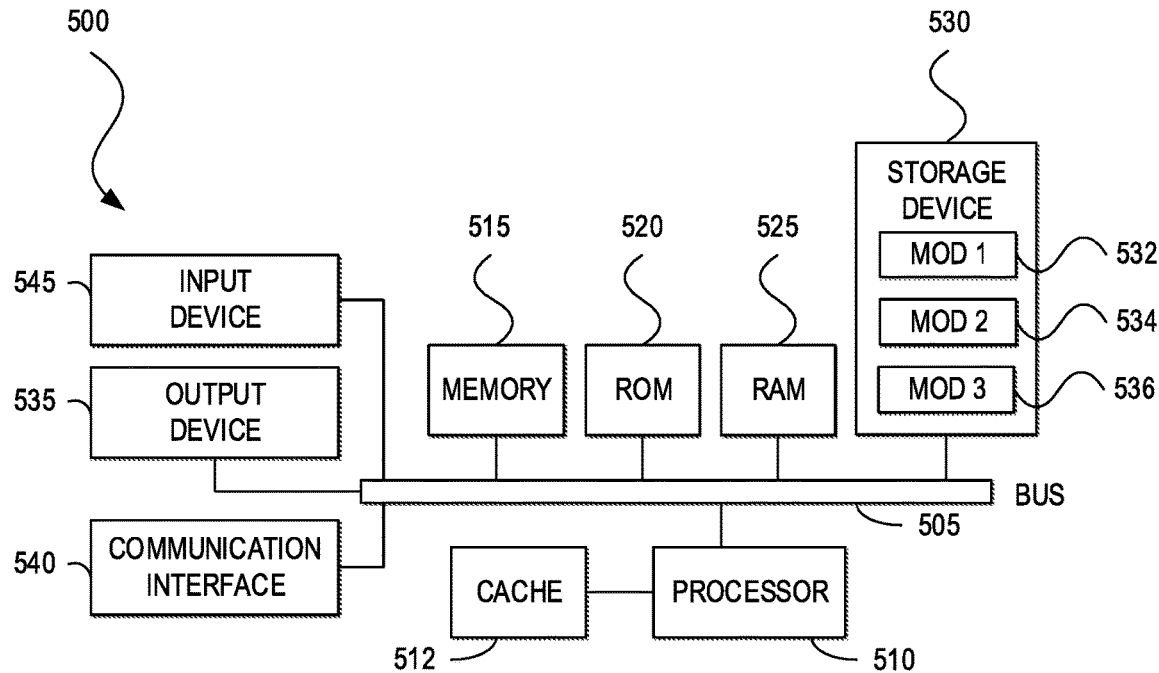
FIGS. 5A and 5B illustrate examples of systems in accordance with some embodiments.
Figure 5B:
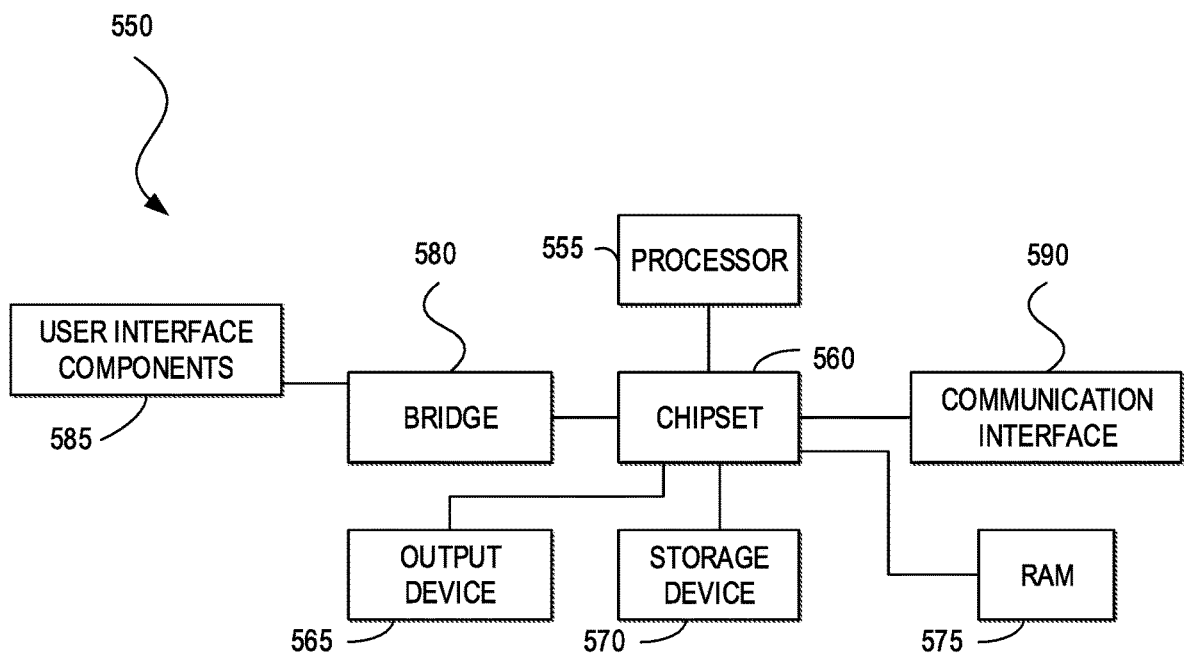

FIG. 5A and FIG. 5B illustrate systems in accordance with various embodiments. The more appropriate system will be apparent to those of ordinary skill in the art when practicing the various embodiments. Persons of ordinary skill in the art will also readily appreciate that other systems are possible.

FIG. 5A illustrates an example of a bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) 520 and random access memory (RAM) 525, to the processor 510. The computing system 500 can include a cache 512 of high-speed memory connected directly with, in close proximity to, or integrated as part of the processor 510. The computing system 500 can copy data from the memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in the storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software modules 532, 534, 536 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, solid state media, and other suitable storage media. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 555 analyzing data stored in the storage device 570 or the RAM 575. Further, the computing system 550 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
   determining, by one or more processors of a physical storage node, a cost of performing each action of a set of actions associated with data deduplication for a predetermined number of epochs to populate a cost matrix, wherein the cost of performing each action is a difference between a total amount of a computing resource of the physical storage node and an amount of the computing resource utilized by processes unassociated with data replication;
   determining a first action from among the set of actions based on the cost of performing each action;
   selecting a random number and a threshold value as part of applying a technique to identify a next action of the set actions to be performed after the predetermined number of epochs as part of the data deduplication;
   in response to determining that the random number is below the threshold value, determining a first cost of performing a randomly selected action from the set of actions and updating the cost matrix with the first cost; and
   in response to determining that the random number exceeds the threshold value, determining a second cost of performing the first action and updating the cost matrix with the second cost.

2. The computer-implemented method of claim 1, wherein the set of actions associated with data deduplication include compressing data, determining one or more hashes for the data and mapping the hashes to a deduplication database, and coalescing multiple contiguous blocks of the data.

3. The computer-implemented method of claim 1, wherein the data deduplication is performed in response to an application executing within the physical storage node.

4. The computer-implemented method of claim 3, wherein the application executes within a virtual machine or a container of the physical storage node.

5. The computer-implemented method of claim 1, further comprising:
   determining normalized metrics of two or more computing resources of the physical storage node utilized for performing each action of the set of actions; and
   combining the normalized metrics for determining at least a portion of the cost of performing each action.

6. The computer-implemented method of claim 1, wherein one or more actions of the set of actions are performed via CPU-offload instructions.

7. The computer-implemented method of claim 1, wherein the physical storage node is one of a plurality of physical storage nodes of a distributed storage data platform.

8. The computer-implemented method of claim 1, wherein the physical storage node is a hybrid storage node including at least one hard disk drive and at least one of a solid state drive (SSD) or a non-volatile memory express (NVMe) storage drive.

9. The computer-implemented method of claim 1, wherein the physical storage node is a Flash memory storage node including at least one of an SSD or an NVMe storage drive.

10. The computer-implemented method of claim 1, wherein the physical storage node excludes a storage device for persistently storing data of a distributed storage data platform.

11. The computer-implemented method of claim 1, wherein the computing resource includes at least one of processing, memory, storage, network bandwidth, network latency, or power of the physical storage node.

12. A system, comprising:
   one or more processors; and
   memory including instructions that, when executed by one or more processors, cause the system to:
      determine a cost of performing each action of a set of actions associated with data deduplication for a predetermined number of epochs to populate a cost matrix, wherein the cost of performing each action is a difference between a total amount of a computing resource of the physical storage node and an amount of the computing resource utilized by processes unassociated with data replication;
      determine a first action from among the set of actions based on the cost of performing each action;
      select a random number and a threshold value as part of applying a technique to identify a next action of the set actions to be performed after the predetermined number of epochs as part of the data deduplication;
      in response to a determination that the random number is below the threshold value, determine a first cost of performing a randomly selected action from the set of actions and update the cost matrix with the first cost; and
      in response to a determination that the random number exceeds the threshold value, determine a second cost of performing the first action and update the cost matrix with the second cost.

13. The system of claim 12, wherein one or more actions of the set of actions are performed via CPU-offload instructions.

14. The system of claim 12, wherein the data deduplication is performed in response to an application executing within a virtual machine or a container of the system.

15. The system of claim 12, wherein the computing resource includes at least one of processing, memory, storage, network bandwidth, network latency, or power of the system.

16. The system of claim 12, wherein the instructions further cause the system to:
   determine normalized metrics of two or more computing resources of the system utilized for performing each action of the set of actions; and
   combine the normalized metrics for a determination of at least a portion of the cost of performing each action.

17. A non-transitory computer-readable storage medium including instructions that, upon being executed by one or more processors of a system, cause the system to:
   determine a cost of performing each action of a set of actions associated with data deduplication for a predetermined number of epochs to populate a cost matrix, wherein the cost of performing each action is a difference between a total amount of a computing resource of the physical storage node and an amount of the computing resource utilized by processes unassociated with data replication;
   determine a first action from among the set of actions based on the cost of performing each action;
   select a random number and a threshold value as part of applying a technique to identify a next action of the set actions to be performed after the predetermined number of epochs as part of the data deduplication;
   in response to a determination that the random number is below the threshold value, determine a first cost of performing a randomly selected action from the set of actions and update the cost matrix with the first cost; and in response to a determination that the random number exceeds the threshold value, determine a second cost of performing the first action and update the cost matrix with the second cost.

18. The non-transitory computer-readable storage medium of claim 17, wherein the set of actions associated with data deduplication include compressing data, determining one or more hashes for the data and mapping the hashes to a deduplication database, and coalescing multiple contiguous blocks of the data.

19. The non-transitory computer-readable storage medium of claim 17, wherein one or more actions of the set of actions are performed via CPU-offload instructions.

20. The non-transitory computer-readable storage medium of claim 17, wherein the data deduplication is performed in response to an application executing within a virtual machine or a container of the system.

* * * * *